United States Patent
Hsiao et al.

(10) Patent No.: US 7,212,380 B2
(45) Date of Patent: May 1, 2007

(54) MAGNETIC WRITE HEAD WITH RECESSED OVERCOAT

(75) Inventors: Wen-Chien David Hsiao, San Jose, CA (US); Wipul Pemsiri Jayaekara, Los Gatos, CA (US); Edward Hin Pong Lee, San Jose, CA (US); Vladimir Nikitin, Campbell, CA (US); Patrick Rush Webb, Los Gatos, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 466 days.

(21) Appl. No.: 10/831,834

(22) Filed: Apr. 26, 2004

(65) Prior Publication Data

US 2005/0237666 A1    Oct. 27, 2005

(51) Int. Cl.
*G11B 5/31*    (2006.01)
*G11B 5/187*   (2006.01)
*G11B 5/255*   (2006.01)
*G11B 5/39*    (2006.01)

(52) U.S. Cl. .................... 360/126; 360/122; 360/236.5
(58) Field of Classification Search .............. 360/126, 360/122, 234.7, 235.7, 236.5
See application file for complete search history.

(56) References Cited

U.S. PATENT DOCUMENTS

| | | | |
|---|---|---|---|
| 5,331,497 A | 7/1994 | Fuchigami | |
| 5,634,259 A | 6/1997 | Sone et al. | |
| 5,872,684 A | 2/1999 | Hadfield et al. | |
| 6,282,061 B1 | 8/2001 | Kanda et al. | |
| 6,421,205 B1 | 7/2002 | Dorius et al. | |
| 6,696,226 B1 | 2/2004 | Dinan et al. | |
| 7,064,925 B2 * | 6/2006 | Maruyama et al. | 360/126 |
| 7,110,219 B2 * | 9/2006 | Ota | 360/128 |
| 2003/0227716 A1 | 12/2003 | Yamakura et al. | |

FOREIGN PATENT DOCUMENTS

| | | |
|---|---|---|
| JP | 59063057 | 4/1984 |
| JP | 4339308 | 11/1992 |
| JP | 8171708 | 7/1996 |

* cited by examiner

*Primary Examiner*—Craig A. Renner
(74) *Attorney, Agent, or Firm*—Rambod Nader; Dillon & Yudell LLP (57) ABSTRACT

A magnetoresistive read/write head having a first layer of alumina and a second layer of silicon dioxide overlaying a P3 layer of the head. In a preferred embodiment, the silicon dioxide layer is recessed away from an Air Bearing Surface (ABS) to reduce protrusion of a P2 layer and the P3 layer in the head, and to reduce degradation in the magnetic properties of the pole tips of the P2 and P3 layer ends.

9 Claims, 10 Drawing Sheets

MAGNETIC WRITE HEAD WITH RECESSED OVERCOAT

BACKGROUND OF THE INVENTION

1. Technical Field

The present invention relates in general to storage systems, and in particular disk drives. Still more particularly, the present invention relates to a write head having a recessed overcoat to improve performance.

2. Description of the Related Art

A hard disk drive (HDD) is a digital data storage device that writes and reads data via magnetization changes of a magnetic storage disk along concentric tracks. As application programs and operating systems become longer with more lines of program code, and data files, particularly graphics files, become larger, the need for additional storage capacity on the HDD increases. Since the trend in HDD design is towards the use of smaller, rather than larger, disks, the solution to increasing the storage capacity of magnetic storage disks is to increase the areal density of data stored on the disk.

Figure 1A:
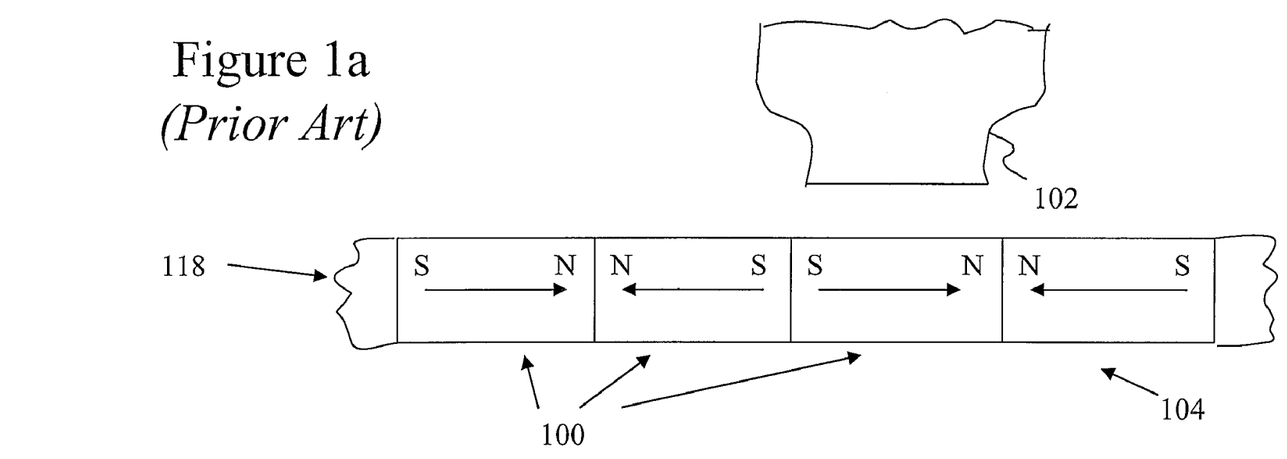
FIG. 1a depicts a prior art longitudinal storage on a magnetic disk.
Figure 1B:
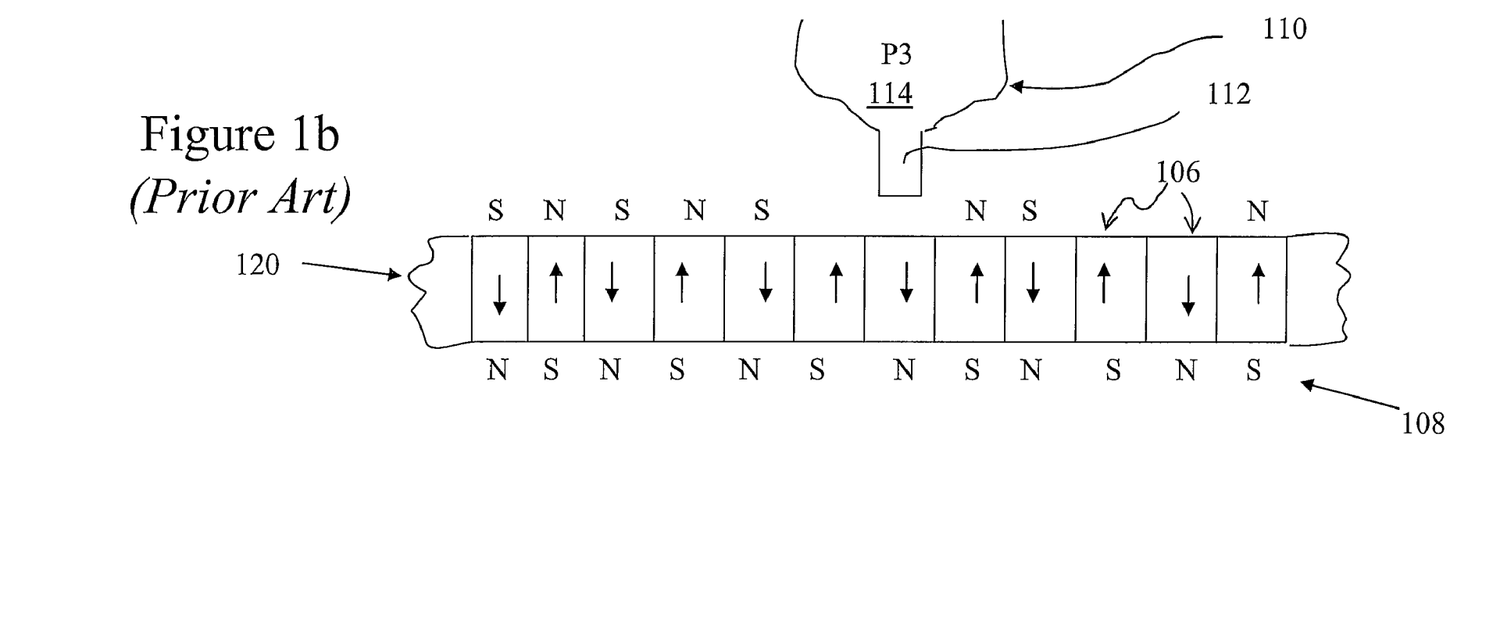
FIG. 1b illustrates a prior art perpendicular storage on a magnetic disk.

Currently, there are two main types of magnetic storage on a magnetic disk: longitudinal and perpendicular. FIGS. 1a and b depict these two types of storage. FIG. 1a depicts the older technology of longitudinal recording. Longitudinal recorded bits 100 are stored when a longitudinal write head 102 magnetizes areas of a magnetic disk 104 in an orientation that is longitudinal to a track 118 on the magnetic disk 104. As shown, the magnetic moment of each subsequent recorded bit is opposing, such that each north pole faces a south pole and vice versa. These opposing moments result in a repulsive force, which leads to long-term instability of the magnetized areas, thus leading to eventual lost data. Nonetheless, longitudinal recording has traditionally been the accepted method of storage because of the materials used to fabricate magnetic disk 104 and the technological limitations on how small a pole tip of longitudinal write head 102 can be and still produce enough flux field to write data.

Modern disk fabrication materials have paved the way for perpendicular recording. These disk fabrication materials typically use a cobalt-chromium ferromagnetic thin film on an amorphous ferromagnetic thin film. This combination of materials affords both ultra-high recording performance along with high thermal stability. The concept of perpendicular recording is illustrated in FIG. 1b. Perpendicular-recorded bits 106 are stored on a perpendicular recording medium 108 as anti-parallel magnets in relation to one another in an orientation that is normal (perpendicular) to the surface of the perpendicular recording medium 108. Because the perpendicular-recorded bits 106 obey the pull of magnetic poles, they do not have the repulsive force of longitudinal recordings, and thus the perpendicular-recorded bits 106 are more stable.

While materials used to construct perpendicular recording medium 108 address part of the technological challenge of perpendicular recording, the other challenge is to fabricate a perpendicular write head 110 having a write pole tip 112 whose tip area is small enough to record the perpendicular-recorded bit 106 without overlapping an area reserved for another perpendicular-recorded bit 106. This overlap must be avoided not only for bit areas on a same track 120, but on bit areas on other tracks (not shown) as well. Thus, the aspect ratio (AR) of linear density (bits per inch—BPI) to track density (Tracks Per Inch—TPI) should be controlled at 1:1 (BPI:TPI) or at most 2:1 to avoid Adjacent Track Interference (ATI).

Furthermore, the perpendicular write head 110 must be able to produce a magnetic field that is powerful enough to magnetize an area for a perpendicular-recorded bit 106 without overwriting other bit areas or having to be so close to the surface of perpendicular recording medium 108 as to make head crashes likely. Furthermore, as write pole tip 112 is scaled to tighter dimensions and constrained by the AR requirements described above, the amount of write field coming out at the tip of write pole tip 112 is attenuated and may be insufficient to magnetize the bit fields.

Figure 2A:
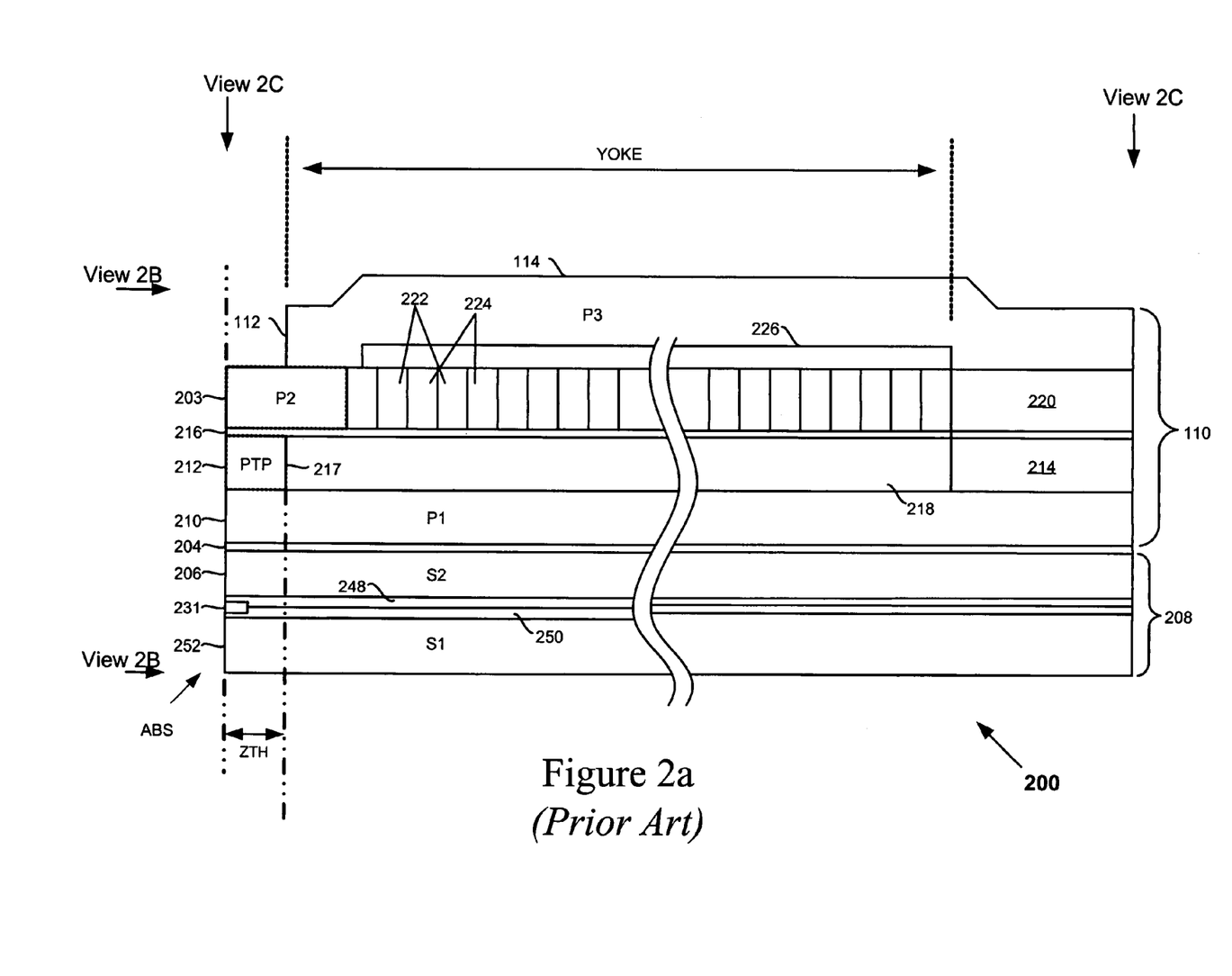
FIGS. 2a–c depict a prior art read/write head.
Figure 2B:
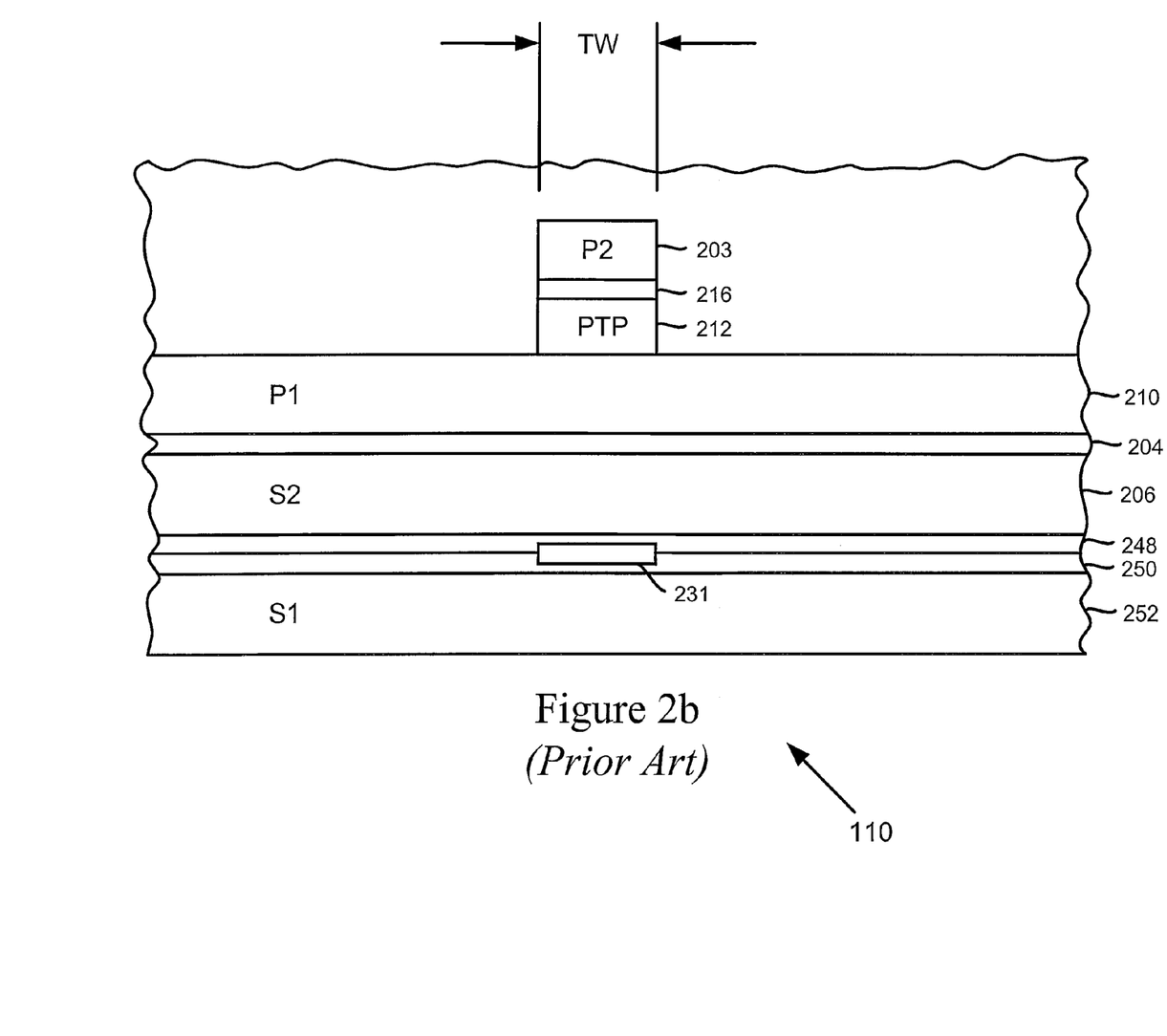
Figure 2C:
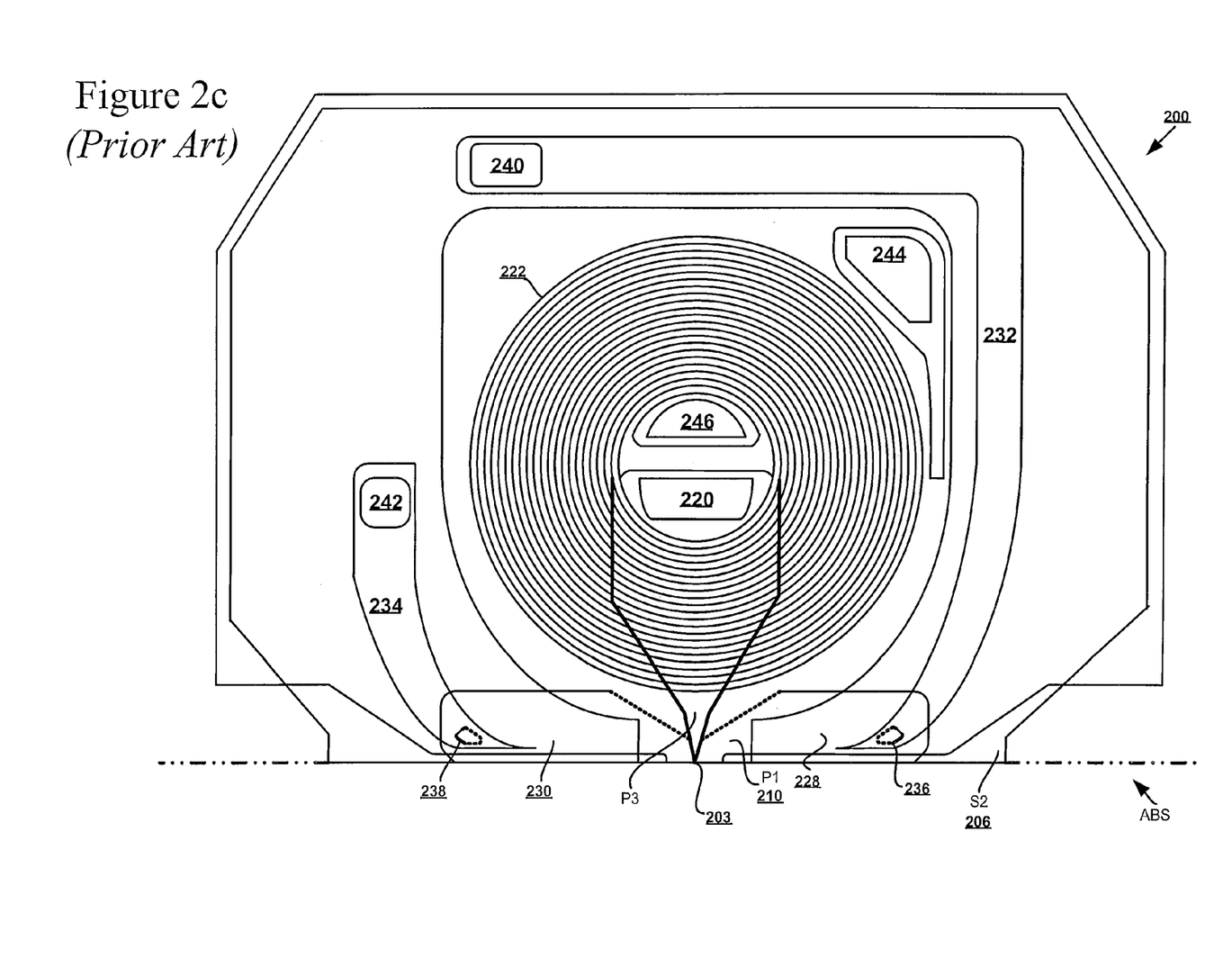

With reference now to FIGS. 2a–c, there are depicted details of a typical read/write head 200. FIG. 2a is a vertical cross-section view, not to scale, FIG. 2b is an Air Bearing Surface (ABS) view (as shown from the perspective described in FIG. 2a as "View 2B"), not to scale, and FIG. 2c (as shown from the perspective described in FIG. 2a as "View 2C") is a top cross-section view, not to scale, of read/write head 200. (As is known to those skilled in the art of hard disk drives, as a disk spins under a read/write head, the small space between the read/write head and the disk is maintained by pressure of air passing between the read/write head and the disk surface, creating an "Air Bearing Surface," or ABS.)

The write head element 110, as seen in FIG. 1b, of head 200 is formed over an insulation layer 204 deposited on a second ferromagnetic shield layer (S2) 206 of a read head element 208. A first write pole piece (P1) layer 210 is plated over insulation layer 204. A Pole Tip Pedestal (PTP) 212 is formed on P1 layer 210 at the ABS. A bottom Back Gap (BG) element 214 is formed over P1 layer 210 at the end distal to the ABS.

An edge 217 of PTP 212 defines a Zero Throat Height (ZTH). An inset insulation layer 218 is formed on P1 layer 210 in the region between the PTP 212 and the BG element 214. After a Chemical and Mechanical Polishing (CMP) planarization step, write gap layer 216 is deposited over the PTP 212 and inset insulation layer 218. A second pole tip (P2) 203 is formed on write gap layer 216 at the ABS, and an upper element 220 of BG element 214 is also formed. A yoke extends from the write pole tip 112 to the edge of the BG element 214 nearest to the ABS.

The Track Width (TW) is defined by the width of P2 203. A coil 222 is formed over write gap layer 216 in the region between P2 203 and upper element 220 of BG element 214. Coil 222 is typically coplanar with the P2 203. Alternatively, coil 222 may be above and/or below P2 203. A coil insulation layer 224 is formed between the coils in coil 222. After a second CMP planarization, a hard-baked resist layer 226 is formed over coils 222 and coil insulation layer 224.

A pole (P3) structure 114 is connected to the tip of P2 203 and the upper element 220 of BG element 214. The tip of P2 203 has a portion which lies under the P3 114 to stitch the two layers. The P3 114 structure is recessed away from the ABS.

Figure 4A:
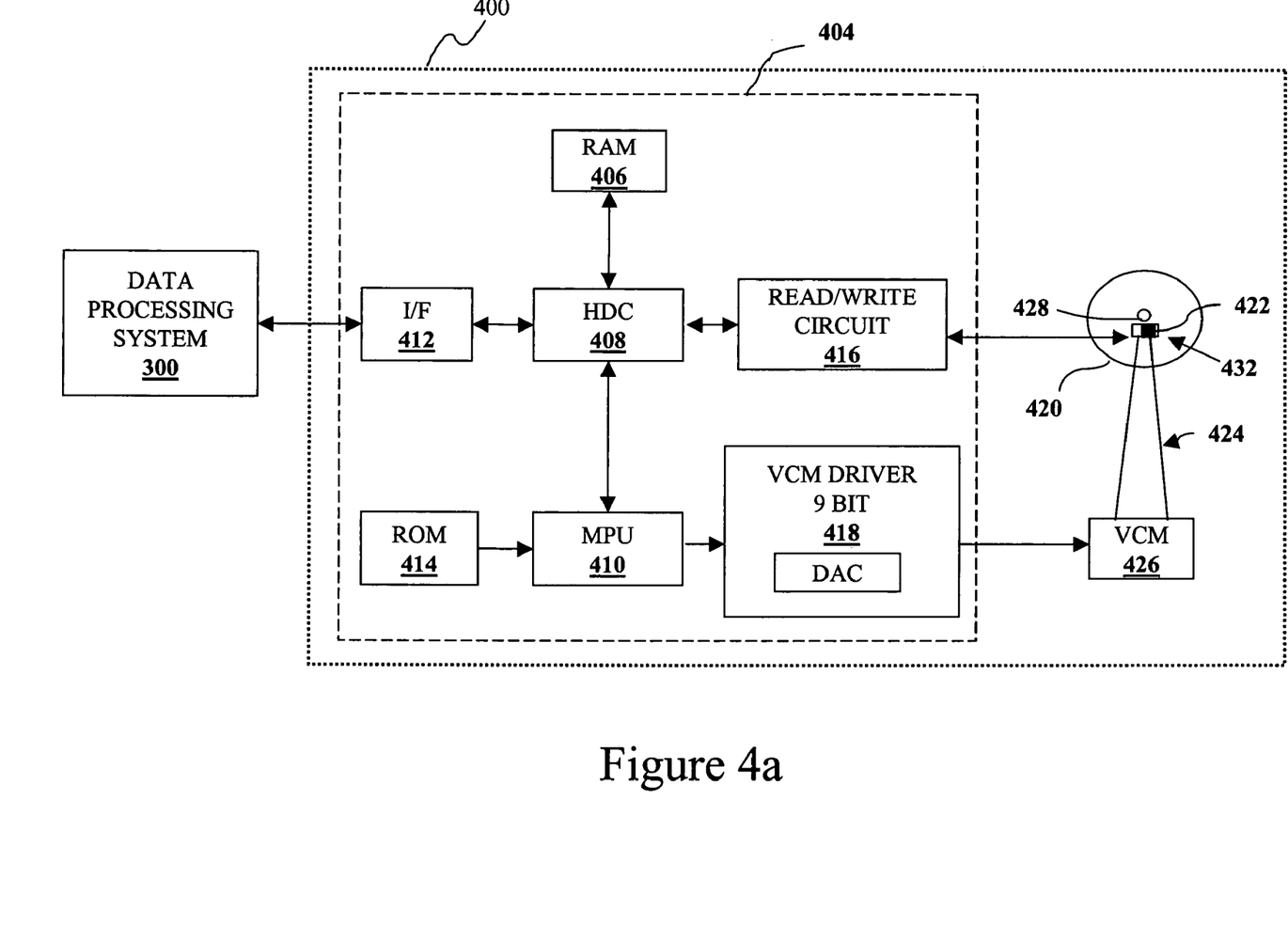
FIG. 4a depicts additional detail of the nonvolatile storage illustrated in FIG. 3.

First and second leads 228 and 230 connect a Magneto-Resistive (MR) sensor 231, which is sandwiched between first and second gap layers 248 and 250, to a read/write circuit, such as a read/write circuit 416 shown in FIG. 4. Gap 250 overlays a first MR shield S1 252.

First and second leads 228 and 230 are connected to first and second conductors 232 and 234, respectively, at conductive vias 236 and 238. The conductors are in turn connected by conductive vias 240 and 242 to leads (not shown) which extend to the read/write circuit. The write coil 222 is connected to write coil pads 244 and 246, which are connected to leads (not shown) that extend to the read/write circuit.

A limitation of the head 200 shown in FIGS. 2a–c is the exposed nature of P3 114. This exposure not only presents unwanted opportunity for P3 114 to be damaged, but is also encourages stray flux fields to emanate outside of the focus required to write to perpendicular-recorded bit 106 seen in FIG. 1b.

What is needed, therefore, is a perpendicular write head that has a very small write pole tip that is able to generate sufficient flux fields for magnetizing data bits areas without ATI issues, and a method to manufacture such a write head.

SUMMARY OF THE INVENTION

In view of the foregoing, the present invention provides a magnetoresistive read/write head that has a first layer of alumina and a second layer of silicon dioxide overlaying a P3 layer of the head. In a preferred embodiment, the silicon dioxide layer is recessed away from an air bearing surface (ABS) to reduce protrusion of a P2 layer and the P3 layer in the head, and to reduce degradation in the magnetic properties of the pole tips of the P2 and P3.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 4b illustrates additional detail of a read/write head used in the nonvolatile storage depicted in FIG. 4a;

DETAILED DESCRIPTION OF A PREFERRED EMBODIMENT

Figure 3:
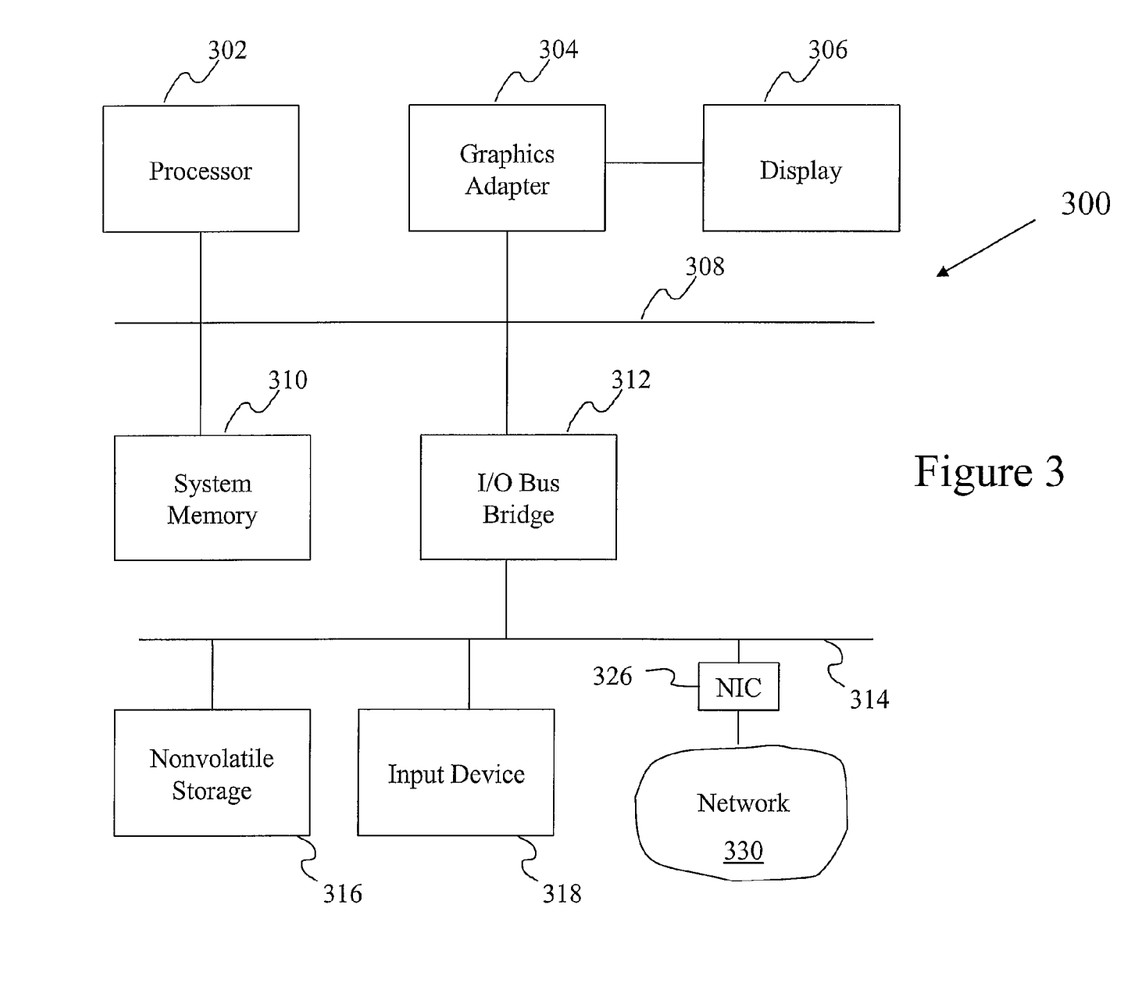
FIG. 3 illustrates an exemplary computer system in which having a nonvolatile storage that uses the read/write head of the present invention.

With reference now FIG. 3, there is depicted a block diagram of a preferred embodiment of a data processing system 300 using the present inventive write head in a disk drive. Data processing system 300 includes a processor 302, which is connected to a system bus 308. In the exemplary embodiment, data processing system 300 includes a graphics adapter 304, also connected to system bus 308, for receiving information for display 306.

Also connected to system bus 308 are a system memory 310 and an Input/Output (I/O) bus bridge 312. I/O bus bridge 312 couples an I/O bus 314 to system bus 308, relaying and/or transforming data transactions from one bus to the other. Peripheral devices such as nonvolatile storage 316, which may be a hard disk drive, floppy drive, a Compact Disk Read-Only Memory (CD-ROM), a Digital Versatile Disk (DVD) drive, or the like, and input device 318, which may include a conventional mouse, a trackball, or the like, is connected to I/O bus 314. Data processing system 300 connects with a network 330 via a Network Interface Card (NIC) 326 as shown.

Network 330 may be the Internet, an enterprise confined intranet, an extranet, or any other network system known to those skilled in the art of computers.

The exemplary embodiment shown in FIG. 3 is provided solely for the purposes of explaining the invention and those skilled in the art will recognize that numerous variations are possible, both in form and function. For instance, data processing system 300 might also include a sound card and audio speakers, and numerous other optional components. All such variations are believed to be within the spirit and scope of the present invention.

With reference now to FIG. 4a, there is depicted additional detail of a Hard Disk Drive (HDD) 400 as contemplated by the present invention for use as nonvolatile storage 316 illustrated in FIG. 3. HDD 400 has a set of hard disks 420, which are rigid platters composed of a substrate and a magnetic medium. Since the substrate is non-magnetic, both sides of each hard disk 420 can be coated with the magnetic medium so that data can be stored on both sides of each hard disk 420.

An actuator arm 424 moves a slider 432, which is gimbal mounted to the actuator arm 424. The slider 432 carries a magnetic read/write head 422 to a specified lateral position above the surface of the hard disk 420 when a Voice Coil Motor (VCM) 426 swings the actuator arm 424.

Data reads/writes between a data processing system 300 and magnetic read/write head 422 are under the control of a controller 404. Controller 404 includes an Interface (I/F) 412 coupled to data processing system 300. Coupled to I/F 412 is a Hard Disk Controller (HDC) 408, which coordinates read/write operations, and controls modes of operation of HDD 400.

Coupled to a HDC 408 is a random access memory 406, which caches data to be read/written on hard disk 420. Read/write circuit 416 includes an Analog-to-Digital Converter (ADC) and a Digital-to-Analog Converter (DAC). The ADC is used to convert analog signals into digital signals for reads from the hard disk 420. The DAC is used to convert digital values into appropriate analog signals for writes to the hard disk 420. A MicroProcessor Unit (MPU) 410, under the control of a micro-program stored in a Read Only Memory (ROM) 414, controls a VCM driver 418. VCM driver 418 controls movement of the VCM 426 using a 9-bit DAC, which converts a digital control signal from MPU 410 into an analog control signal for VCM 426. Typically, VCM driver 418 also works in coordination with a controller (not shown) for spindle 428, to provide proper positioning of read/write head 422 above the surface of hard disk 420 during read/write operations.

Figure 4B:
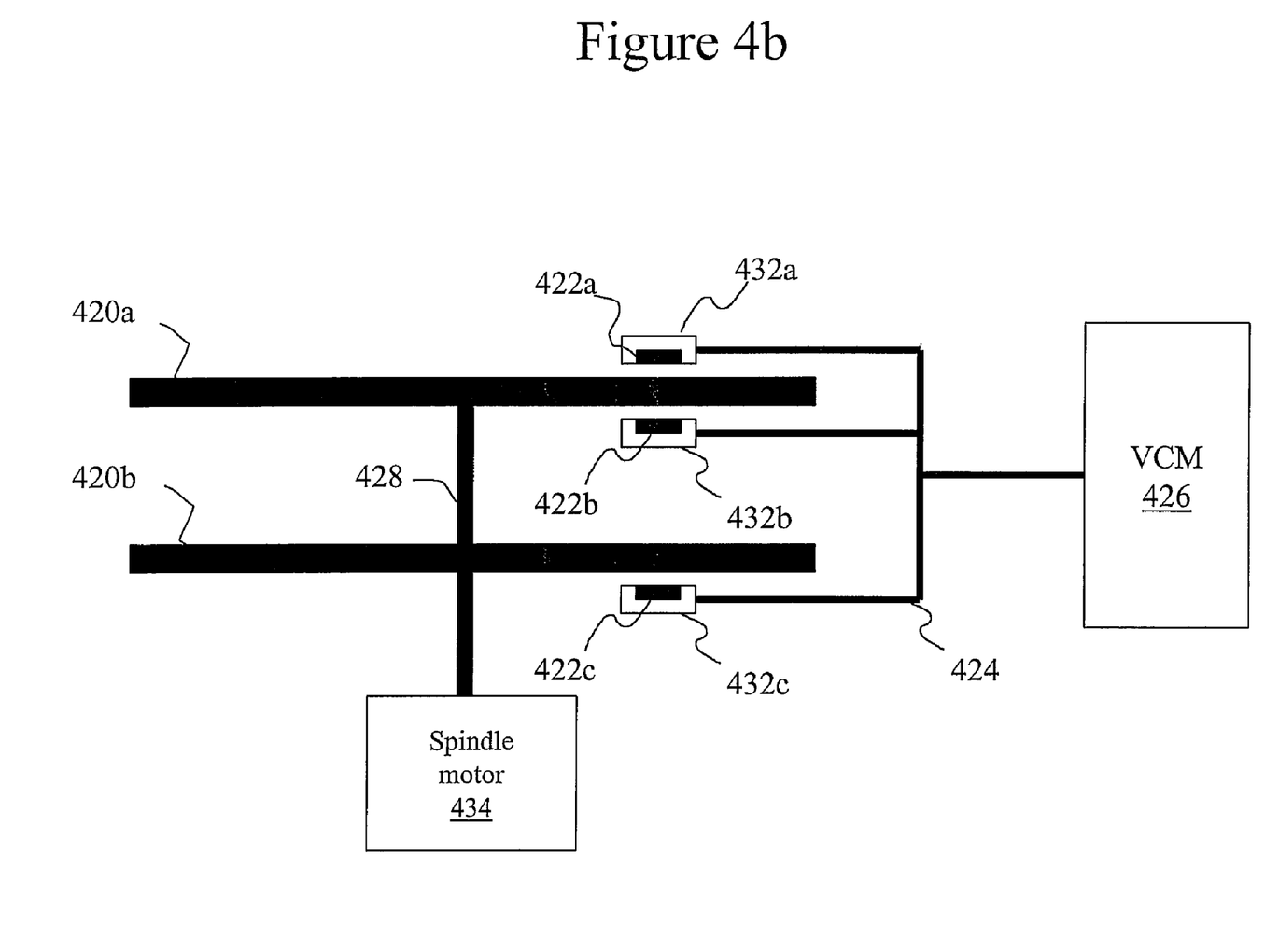

With reference now to FIG. 4b, there is depicted additional detail of hard disks 420. Hard disks 420 are a stack of hard disk platters, shown in exemplary form as hard disks 420a–b. Preferably, more than two platters are used, but only two are shown for purposes of clarity. As a spindle motor 434 turns spindle 428, each hard disk 420 connected to spindle 428 rotates at speeds in excess of 10,000 Revolutions Per Minute (RPMs). Each hard disk 420 has two surfaces, one or both of which can be magnetized to store data. Thus, hard disk 420a is able to store data on both sides using read/write heads 422a and 422b. Hard disk 420b stores data on only one side using read/write head 422c. Thus, the system illustrated in FIG. 4b is a two-platter three-head HDD, having three read/write heads 422a–c, which are embedded in respective sliders 432a–c. By swinging the actuator arm 424 (and thus causing the movement of slider 432 and read/write head 422) and rotating the spindle 428 (and thus spinning hard disk 420), read/write head 422 can be positioned above any spot above the surface of hard disk 420.

Figure 5:
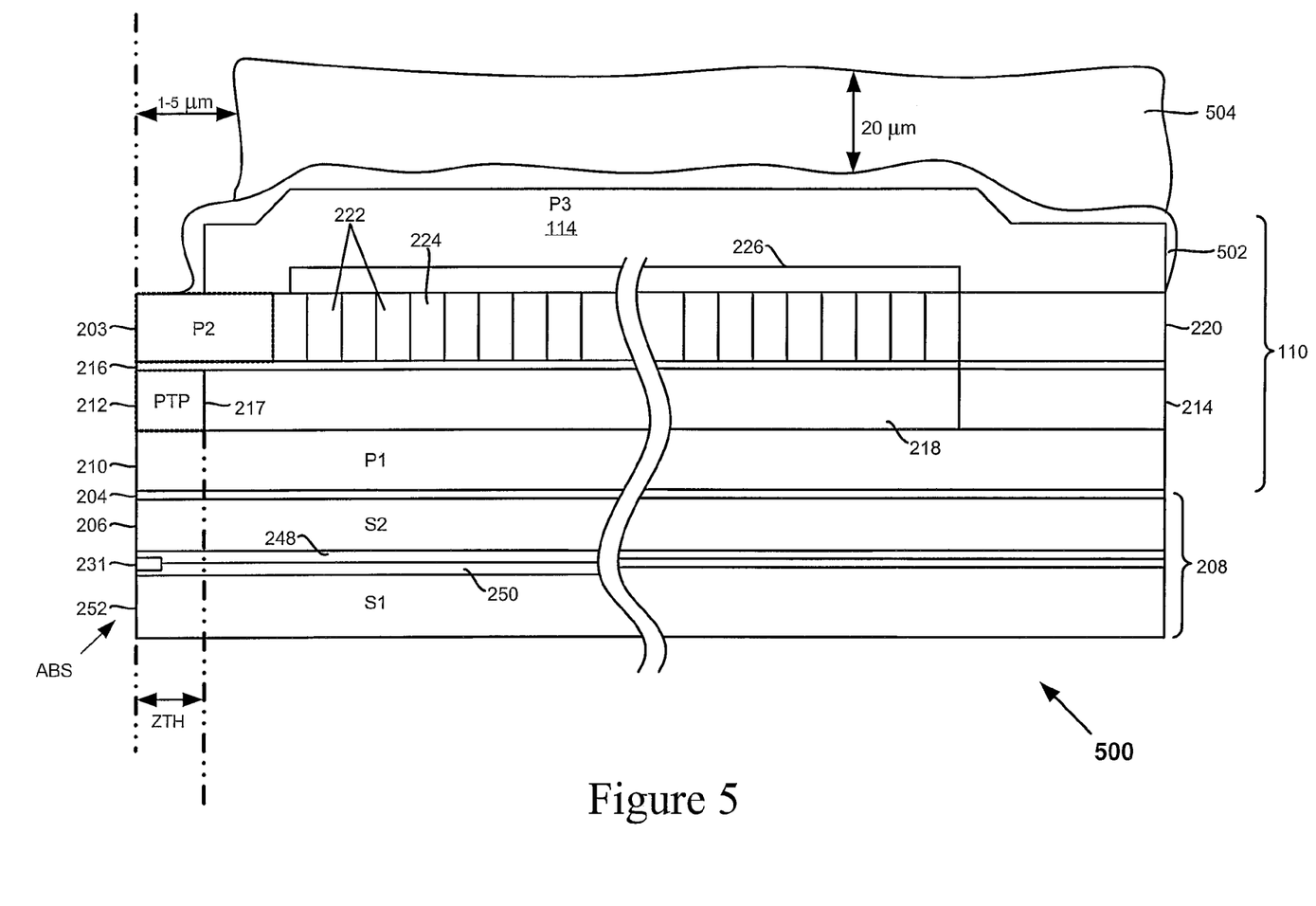
FIG. 5 depicts the inventive read/write head having overcoats of alumina and silica.

With reference now to FIG. 5, there is depicted a cross-sectional view of inventive head 500. Inventive head 500 includes most of the features described above in FIG. 2a as head 200. These common features will not be readdressed here. Additionally, inventive head 500 includes an alumina layer 502 and a silica layer 504. As depicted, alumina layer 502, which is composed of aluminum oxide ($Al_2O_3$), overlays P3 114. In a preferred embodiment, alumina layer 502 is approximately 1 micrometer (micron) thick. Similarly, silica layer 504, which is composed of silicon dioxide ($SiO_2$) is approximately 20 microns thick. Alumina layer 502 and silica layer 504 are applied over P3 114 during fabrication of inventive head 500 using techniques known to those skilled in the art of wafer and head fabrication, including but not limited to sputtering, Reactive Ion Etching (RIE), Chemical and Mechanical Polishing (CMP) and ion milling.

In a preferred embodiment, silica layer 504 is recessed from the ABS, preferably 1–5 microns. The advantage of this recess is discussed in FIGS. 6a–6b.

Figure 6A:
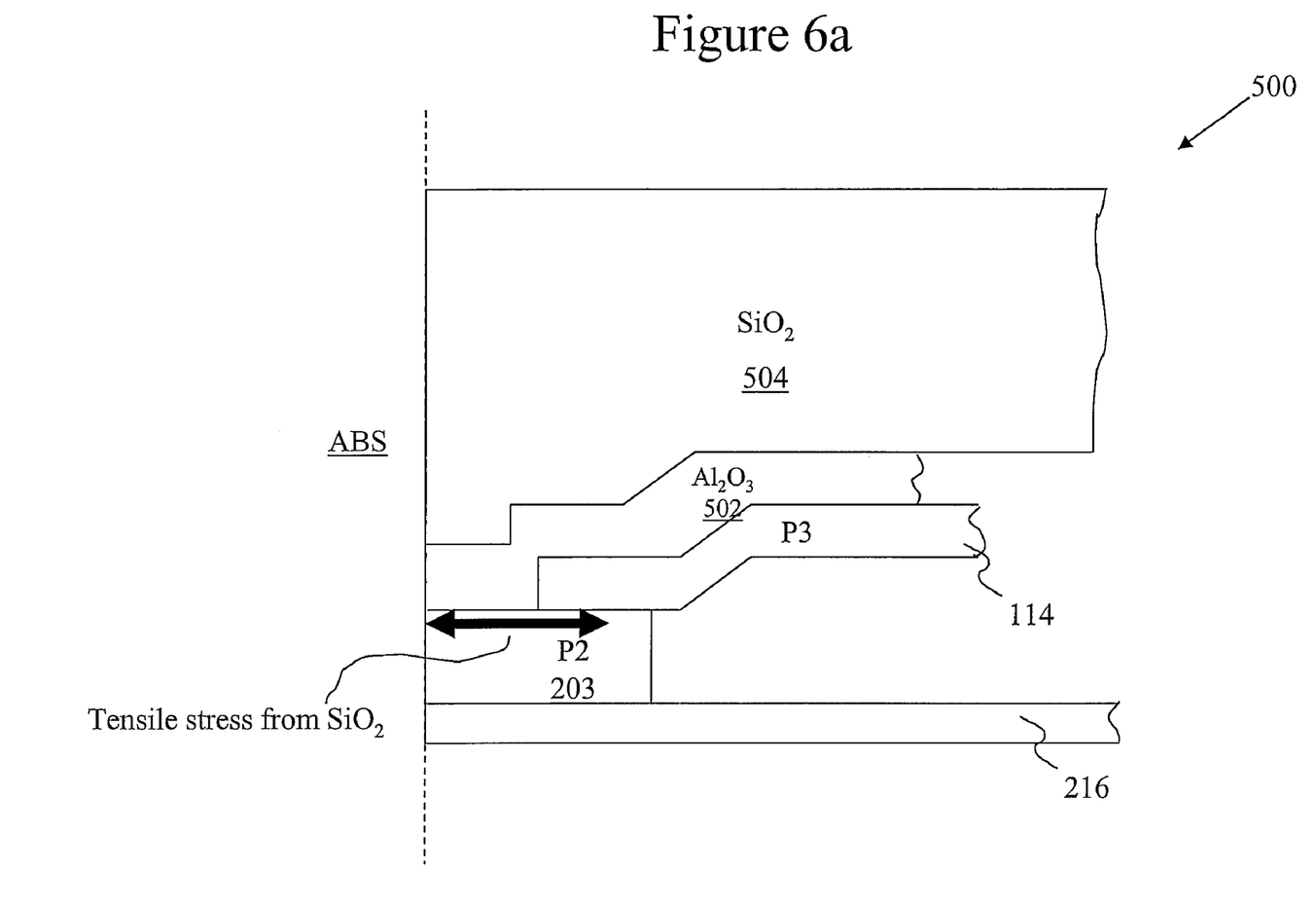
FIG. 6a illustrates the inventive read/write head with a silica overcoat abutting an Air Bearing Surface (ABS)

Referring then to FIG. 6a, there is depicted a portion of inventive head 500. As depicted, silica layer 504 is flush with or nearly flush with the ABS. However, such positioning causes potential problems with head 500. Specifically, the portion of silica layer 504 that is directly above the tip of P2 203 causes the tip of P2 203 under tensile stress during the head building process. The tensile stress of the tip of P2 203 is further degraded by silica layer 504 at low operating temperature due to the mismatch of coefficient of thermal expansion. The tensile stress of the tip of P2 203 significantly reduces the recording head efficiency. A larger operating write current is therefore needed to partially compensate the reduced recording head efficiency. The protrusion would also significantly increase with the larger operating write current.

Figure 6B:
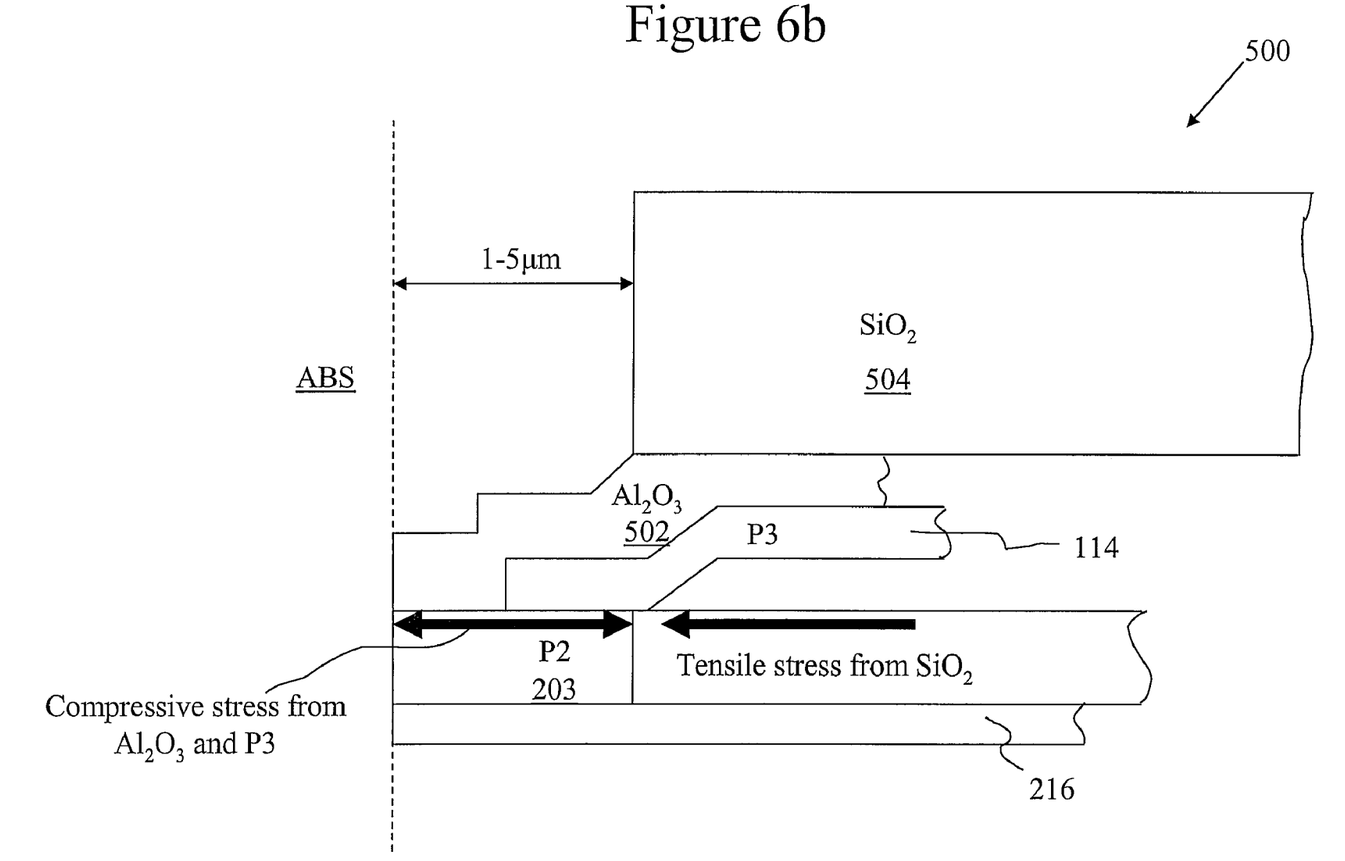
FIG. 6b depicts the inventive read/write head having the silica overcoat recessed from the ABS.

Referring now to FIG. 6b, the preferred embodiment of the present invention is shown with silica layer 504 being recessed away from the ABS, preferably from 1–5 microns. This recession has multiple benefits. First, there is reduced protrusion of P2 203, due to the lower operating write current is needed with the reduced tensile stress of P2 203. The recessed silica layer 504 generates a compressive stress to the tip of P2 203 during the head building process as well as at the low operating temperature. This more favorable stress state enhances the recording head efficiency as well as the operating write current.

Second, the writer high frequency performance is improved. The reduced tensile stress on the tip of P2 203 improves the magnetic properties of P2 203 due to the recess with silica layer 504.

Third, recessing silica layer 504 away from the ABS reduces the possibility of tribology (wearing away) of silica layer 504 caused by friction from the ABS.

Finally, since the thickness of silica layer 504 can be fairly thick, especially when compared to alumina layer 502, there are fewer concerns during fabrication with regards to cutting/polishing the silica layer 504.

The present invention therefore affords a read/write head which is improved by a recessed layer of silica over a layer of alumina above the P3. The head has reduced temperature-induced protrusion and improved magnetic properties of the P2. In addition, by being recessed from the ABS, the silica layer is not exposed to tribology from the ABS.

While the invention has been particularly shown and described with reference to a preferred embodiment, it will be understood by those skilled in the art that various changes in form and detail may be made therein without departing from the spirit and scope of the invention. For example, while the silica layer (overcoat) has been described as being composed of silicon dioxide, silicon dioxide with impurities may also be used. Similarly, any material showing similar chemical, mechanical, electrical and magnetic properties as silicon dioxide may be used in silica layer. Likewise, while the alumina layer (overcoat) has been described as being composed of aluminum oxide, aluminum oxide with impurities may also be used. Similarly, any material showing similar chemical, mechanical, electrical and magnetic properties as aluminum oxide may be used in alumina layer. It is also noted that none of the figures depicting the present invention are to be viewed as being to scale, unless otherwise noted.

What is claimed is:

1. A write head comprising:
   a P1 layer;
   a P2 layer overlaying the P1 layer;
   a P3 layer overlaying the P2 layer, a write tip of the P3 layer being oriented towards and recessed from an air bearing surface (ABS);
   a first overcoat overlaying the P3 layer, wherein the first overcoat comprises alumina; and
   a second overcoat overlaying the first overcoat, the second overcoat being recessed 1–5 micrometers away from the ABS, wherein the second overcoat comprises silica.

2. The write head of claim 1, wherein the second overcoat has a thickness of 20–30 micrometers over the first overcoat.

3. The write head of claim 1, wherein the first overcoat has a thickness of approximately 1 micrometer.

4. A disk drive having a write head, the write head comprising:
   a P1 layer;
   a P2 layer overlaying the P1 layer;
   a P3 layer overlaying the P2 layer, a write tip of the P3 layer being oriented towards and recessed from an air bearing surface (ABS);
   a first overcoat overlaying the P3 layer, wherein the first overcoat comprises alumina; and
   a second overcoat overlaying the first overcoat, the second overcoat being recessed 1–5 micrometers away from the ABS, wherein the second overcoat comprises silica.

5. The disk drive of claim 4, wherein the second overcoat has a thickness of 20–30 micrometers over the first overcoat.

6. The disk drive of claim 4, wherein the first overcoat has a thickness of approximately 1 micrometer.

7. A computer system comprising:
   a disk drive, the disk drive comprising a write head, the write head comprising:
   a P1 layer;
   a P2 layer overlaying the P1 layer;
   a P3 layer overlaying the P2 layer, a write tip of the P3 layer being oriented towards and recessed from an air bearing surface (ABS);
   a first overcoat overlaying the P3 layer, wherein the first overcoat comprises alumina; and
   a second overcoat overlaying the first overcoat, the second overcoat being recessed 1–5 micrometers away from the ABS, wherein the second overcoat comprises silica.

8. The computer system of claim 7, wherein the second overcoat has a thickness of 20–30 micrometers over the first overcoat.

9. The computer system of claim 7, wherein the first overcoat has a thickness of approximately 1 micrometer.

* * * * *

UNITED STATES PATENT AND TRADEMARK OFFICE
CERTIFICATE OF CORRECTION

| | | |
|---|---|---|
| PATENT NO. | : 7,212,380 B2 | Page 1 of 1 |
| APPLICATION NO. | : 10/831834 | |
| DATED | : May 1, 2007 | |
| INVENTOR(S) | : Wen-Chien D. Hsiao et al. | |

It is certified that error appears in the above-identified patent and that said Letters Patent is hereby corrected as shown below:

On the Title Page, Item (75), line 4, delete "Wipul Pemsiri Jayaekara" and insert --Wipul Pemsiri Jayasekara--.

Signed and Sealed this

Tenth Day of July, 2007

JON W. DUDAS
*Director of the United States Patent and Trademark Office*